United States Patent
Dariush et al.

(10) Patent No.: US 9,904,845 B2
(45) Date of Patent: Feb. 27, 2018

(54) BODY FEATURE DETECTION AND HUMAN POSE ESTIMATION USING INNER DISTANCE SHAPE CONTEXTS

(75) Inventors: Behzad Dariush, Sunnyvale, CA (US); Raghuraman Gopalan, College Park, MD (US)

(73) Assignee: HONDA MOTOR CO., LTD., Tokyo (JP)

(*) Notice: Subject to any disclaimer, the term of this patent is extended or adjusted under 35 U.S.C. 154(b) by 1272 days.

(21) Appl. No.: 12/709,221

(22) Filed: Feb. 19, 2010

(65) Prior Publication Data

US 2010/0215271 A1    Aug. 26, 2010

Related U.S. Application Data

(60) Provisional application No. 61/155,439, filed on Feb. 25, 2009.

(51) Int. Cl.
  *G06K 9/46*  (2006.01)
  *G06K 9/00*  (2006.01)
  *G06K 9/48*  (2006.01)

(52) U.S. Cl.
  CPC ....... *G06K 9/00369* (2013.01); *G06K 9/4671* (2013.01); *G06K 9/48* (2013.01)

(58) Field of Classification Search
  CPC .. G06K 9/4671; G06K 9/6253; G06K 9/6201; G06K 9/00369; G06K 9/00201;
  (Continued)

(56) References Cited

U.S. PATENT DOCUMENTS 5,815,397 A    9/1998  Saito et al.
6,363,160 B1   3/2002  Bradski et al.
(Continued)

FOREIGN PATENT DOCUMENTS

JP     2007-514211 A    5/2007
WO  WO 2004/107266 A1  12/2004
(Continued)

OTHER PUBLICATIONS

Holte et al., Fusion of Range and Intensity Information for View Invariant Gesture Recognition, Jun. 23-28, 2008, IEEE Computer Society Conference on Computer Vision and Pattern Recognition Workshops, 7 pages total.*
(Continued)

*Primary Examiner* — Andrew Moyer
*Assistant Examiner* — Dennis Rosario
(74) *Attorney, Agent, or Firm* — Arent Fox LLP

(57) ABSTRACT

A system, method, and computer program product for estimating human body pose are described. According to one aspect, a human figure silhouette is segmented from a depth image of a human actor. Contour points are sampled along the human figure silhouette. Inner Distance Shape Context (IDSC) descriptors of the sample contour points are determined and compared to IDSC descriptors of the feature points in an IDSC gallery for similarity. For each of the feature points, the sample contour point with the IDSC descriptor that is most similar to an IDSC of the feature point is identified as that feature point in the depth image. An estimated pose of a human model is estimated based on the detected feature points and kinematic constraints of the human model.

16 Claims, 8 Drawing Sheets

(58) Field of Classification Search
CPC .......... G06K 9/00362; G06K 9/00355; G06K 9/00342; G06F 17/30247; G06F 3/017; G06F 3/011; G06F 3/013; G06T 7/0081; G06T 2207/10016; G06T 7/0042; G06T 2207/30196; G06T 7/2046; G06T 7/0083; G06T 2207/10028
USPC .......................................................... 382/173
See application file for complete search history.

(56) References Cited

U.S. PATENT DOCUMENTS

| | | | |
|---|---|---|---|
| 6,674,877 | B1 | 1/2004 | Jojic et al. |
| 6,853,964 | B1 | 2/2005 | Rockwood et al. |
| 7,453,455 | B2 * | 11/2008 | Park et al. ..................... 345/419 |
| 7,457,733 | B2 | 11/2008 | Maille et al. |
| 7,925,049 | B2 * | 4/2011 | Zhu .......................... G06K 9/32 382/103 |
| 8,090,155 | B2 | 1/2012 | Lacey et al. |
| 8,170,287 | B2 * | 5/2012 | Dariush et al. ................ 382/106 |
| 8,200,648 | B2 * | 6/2012 | Boiman ............ G06F 17/30787 707/706 |
| 2003/0113018 | A1 | 6/2003 | Nefian et al. |
| 2004/0193413 | A1 | 9/2004 | Wilson et al. |
| 2005/0271279 | A1 | 12/2005 | Fujimura et al. |
| 2006/0182346 | A1 | 8/2006 | Yoda et al. |
| 2006/0269145 | A1 | 11/2006 | Roberts |
| 2007/0110306 | A1 | 5/2007 | Ling et al. |
| 2007/0140562 | A1 | 6/2007 | Linderman |
| 2007/0255454 | A1 | 11/2007 | Dariush |
| 2008/0019589 | A1 | 1/2008 | Yoon et al. |
| 2008/0085048 | A1 | 4/2008 | Venetsky et al. |
| 2008/0181459 | A1 | 7/2008 | Martin et al. |
| 2008/0247649 | A1 | 10/2008 | Cheng |
| 2008/0317331 | A1 | 12/2008 | Winn et al. |
| 2009/0074252 | A1 | 3/2009 | Dariush et al. |
| 2009/0175540 | A1 * | 7/2009 | Dariush et al. ................ 382/195 |
| 2009/0252423 | A1 * | 10/2009 | Zhu et al. ..................... 382/209 |
| 2009/0263023 | A1 | 10/2009 | Iwamoto |
| 2010/0215257 | A1 | 8/2010 | Dariush et al. |

FOREIGN PATENT DOCUMENTS

| | | |
|---|---|---|
| WO | WO 2007/138858 A1 | 12/2007 |
| WO | WO 2010/099034 A1 | 9/2010 |
| WO | WO 2010/099035 A1 | 9/2010 |

OTHER PUBLICATIONS

Ling et al., Using the Inner-Distance for Classification of Articulated Shapes, Jun. 20-25, 2005, IEEE Computer Society Conference on Computer Vision and Pattern Recognition, vol. 2, pp. 719-726.*
Tsalakanidou et al., Face Localization and Authentication Using Color and Depth Images, Feb. 2005, IEEE Transactions on Image Processing, vol. 14, Issue:2, pp. 152-168.*
Mori et al., Estimating Human Body Configuration Using Shape Context Matching, May 28-31, 2002, Lecture Notes in Computer Science: 7th European Conference on Computer Vision: 2002 Proceedings, Part III, vol. 2352, pp. 666-680.*
Belongie et al., Shape Matching and Object Recognition Using Shape Contexts, Apr. 2002, IEEE Transactions on Pattern Analysis and Machine Intelligence, vol. 24, Issue:4, pp. 509-522.*
Thayananthan et al., Shape Context and Chamfer Matching in Cluttered Scenes [on-line], Jun. 18-20, 2003 [retrieved on Jan. 15, 2013], IEEE Computer Society Conference on Computer Vision and Pattern Recognition, vol. 1, pp. 1-7.*
Harville et al., 3D Pose Tracking with Linear Depth and Brightness Constraints [on-line], 1999 [retrieved on Jan. 15, 2013], The Proceedings of the Seventh IEEE International Conference on Computer Vision, 1999, vol. 1, 8 total pages.*
Gopalan et al., Toward a vision based hand gesture interface for robotic grasping, Oct. 10-15, 2009 [retrieved Mar. 17, 2016], 2009 IEEE/RSJ International Conference on Intelligent Robots and Systems, pp. 1452-1459. Retrived from the Internet: http://ieeexplore.ieee.org/xpls/abs_all.jsp?arnumber=5354682&tag=1.*
Roodsarabi et al., 3D Human Motion Reconstruction Using Video Processing, Jul. 1-3, 2008 [retrieved Mar. 17, 2016], Image and Signal Processing: ICISP 2008 3rd International Conference, vol. 5099, pp. 386-395. Retrived from the Internet: http://link.springer.com/chapter/10.1007/978-3-540-69905-7_44.*
Herda et al., Hierarhical implicit surface joint limits for huamn body tracking, Aug. 2005 [retrieved Aug. 15, 2016], Computer Vision and Image Understanding, vol. 99, Issue 2, pp. 189-209. Retrieved from the Internet: http://www.sciencedirect.com/science/article/pii/S1077314205000159.*
Yue et al., Synthesis of Silhouettes and Visual Hull Reconstruction for Articulated Humans, Dec. 2008 [retrieved Jan. 4, 2017], IEEE Transactions on Multimedia, vol. 10, Issue:8, pp. 1565-1577. Retrieved from the Internet: http://ieeexplore.ieee.org/document/4671049/?arnumber=4671049&tag=1.*
Dariush et al., Online and markerless motion retargeting with kinematic constraints, Sep. 22-26, 2008 [retrieved Jun. 28, 2017], 2008 IEEE/RSJ International Conference on Intelligent Robots and Systems , pp. 191-198. Retrieved from the Internet: http://ieeexplore.ieee.org/stamp/stamp.jsp?arnumber=4651104.*
Zhu et al., Controlled human pose estimation from depth image streams, Jun. 23-28, 2008 [retrieved Jun. 28, 2017], 2008 IEEE Computer Society Conference on Computer Vision and Pattern Recognition Workshops, 8 pages total. Retrieved from the Internet: http://ieeexplore.ieee.org/stamp/stamp.jsp?arnumber=4563163.*
Andrews, R., "Tracking Multiple Objects in Real Time," Submitted for the degree of Bachelor of Engineering Honours, University of Queensland, Oct. 1999, 83 pages, Brisbane, Australia.
Chen, L., "Efficient Partial Shape Matching Using Smith-Waterman Algorithm," CVPR Workshop on Non-Rigid Shape Analysis and Deformable Image Alignment (Nordia'08),Jun. 27-28, 2008, 6 pages, Anchorage, Alaska.
Jorstad, A., "Leaf Classification from Local Boundary Analysis," AMSC 664, Spring 2008, 28 pages, University of Marlyland, USA.
Ling, H., "An Efficient Earth Mover's Distance Algorithm for Robust Histogram Comparison," Center for Automation Research, Computer Science Department, University of Maryland, 35 pages, College Park, Maryland, USA.
Ling, H. et al., "Shape Classification Using the Inner-Distance," IEEE Transactions on Pattern Analysis and Machine Intelligence, 2007, vol. 29, No. 2, 35 pages.
PCT International Search Report and Written Opinion, PCT Application No. PCT/US2010/024697, Apr. 20, 2010, 7 pages.
PCT International Search Report and Written Opinion, PCT Application No. PCT/US2010/024689, Apr. 21, 2010, 6 pages.
Turk, M. et al., "Face Recognition Using Eigenfaces," Proceedings of the IEEE Conference on Computer Vision and Pattern Recognition (CVPR 91), 1991, pp. 586-591.
Zhu, G. et al., "Learning Visual Shape Lexicon for Document Image Content Recognition," European Conference on Computer Vision, 2008, Part II, LNCS 5305, pp. 745-758, Marseille, France.
Zhu, Y. et al., "Controlled Human Pose Estimation from Depth Image Streams," Proceedings of IEEE Computer Society Conference on Computer Vision and Pattern Recognition Workshops, 2008, 8 pages, Anchorage, Alaska.
United States Patent and Trademark Office, Non-Final Rejection, U.S. Appl. No. 12/709,287, Oct. 3, 2012, 22 pages.
Japanese Patent Office, Office Action, Japanese Patent Application No. P 2011-552074, Feb. 17, 2014, seven pages.
Wagner, S. et al., "Framework for a Portable Gesture Interface," *Proceedings of the 7th International Conference on Automatic Face and Gesture Recognition*, 2006, pp. 275-280.
Malassiotis, S. et al., "Real-Time Hand Posture Recognition Using Range Data," Image and Vision Computing, Jul. 2, 2008, pp. 1027-1037, vol. 26, Issue 4, [Online] [Retrieved on Jan. 11, 2013] Retrieved from the Internet<URL:http://www.sciencedirect.com/science/article/pii/S0262885607002090>.

(56) References Cited

OTHER PUBLICATIONS

Yang, J. et al., "Two-Dimensional PCA: A New Approach to Appearance-Based Face Representation and Recognition," IEEE Transactions on Pattern Analysis and Machine Intelligence, Jan. 2004, pp. 131-137, vol. 26, Issue 1, [Online] [Retrieved on Jan. 11, 2013] Retrieved from the Internet<URL:http://ieeexplore.ieee.org/xpls/abs_all.jsp?arnumber=1261097>.

Agarwal et al., "Recovering 3d human pose from monocular images", IEEE Trans. on Pattern Analysis and Machine Intelligence, 28(1):44-58 (2006).

Barron et al., "Estimating anthropometry and pose from a single image", Computer Vision and Pattern Recognition, 1:669-676 (2000).

Chan et al., "A weighted least-norm solution based scheme for avoiding joint limits for redundant joint manipulators", IEEE Transactions on Robotics and Automation, 11(2), (1995).

Craig, "Introduction to robotics, mechanics and control", Addison-Wesley, 2nd edition (1989).

Gavrila, "The visual analysis of human movement: a survey", Computer Vision and Image Understanding, 73(1):82-98 (1999).

Moeslund et al., "A survey of advances in vision-based human motion capture and analysis", Computer Vision and Image Understanding, 104(2,3):90-126 (2006).

Mori et al., "Recovering 3d human body configurations using shape contexts", IEEE Trans. on Pattern Analysis and Machine Intelligence, 28(7):1052-1062 (2006).

Niebles et al., A Hierarchical Model of Shape and Apperance for Human Action Classification, Jun. 17-22, 2007, IEEE Conference on Computer Vision and Pattern Recognition, 6 pages total, 2007.

Rehg et al., "Model-based tracking of selfoccluding articulated objects", ICCV, pp. 612-617 (1995).

Shaknarovich et al., "Fast pose estimation with parameter sensitive hashing", ICCV, 2:750-757 (2003).

Siciliano et al., "A general framework for managing multiple tasks in high redundant robotic systems", International Conference on Advanced Robotics, vol. 2, pp. 1211-1216, Pisa, Italy (1991).

Sidenbladh et al., "Stochastic tracking of 3D human figures using 2D image motion", ECCV, pp. 702-718, (2000).

Taylor, "Reconstruction of articulated objects from point correspondences in a single uncalibrated image", Computer Vision and Image Understanding, 80(3):349-363 (2000).

United States Patent and Trademark Office, Final Rejection, U.S. Appl. No. 12/456,257, dated Dec. 4, 2012, 24 pages.

United States Patent and Trademark Office, Final Rejection, U.S. Appl. No. 12/317,369, dated Aug. 31, 2012, 21 pages.

United States Patent and Trademark Office, Non-Final Rejection, U.S. Appl. No. 12/455,257, dated Jun. 26, 2012, 20 pages.

Wang et al., "Recnent developments in human motion analysis"Pattern Recog., 36(3):585-601 (2003).

Zghal et al., "Efficient gradient projection optimization for manipulators with multiple degress of redundancy", Int. Conf. Robotics and Automation, vol. 2, pp. 1006-1011 (1990).

Zhang et al., "Learning a Discriminative Classifier Using Shape Context Distances", Proceedings of the 2003 IEEE Computer Society Conference on Computer Vision and Pattern Recognition, vol. 1, 6 total pages, Jun. 18-20, 2003.

\* cited by examiner

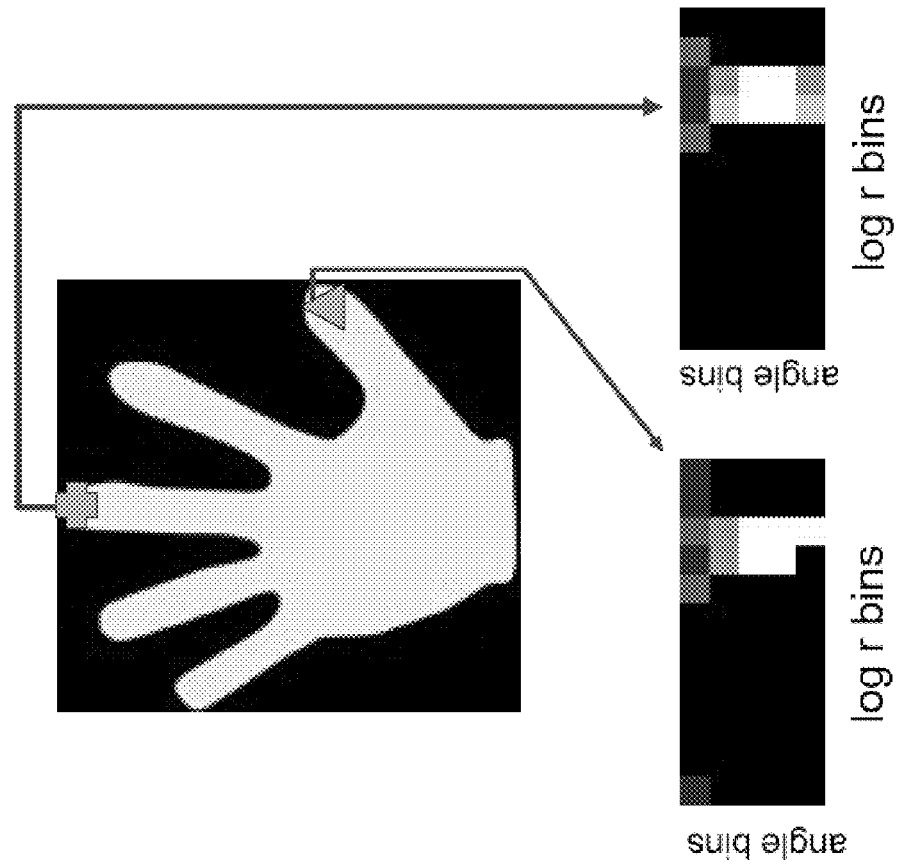
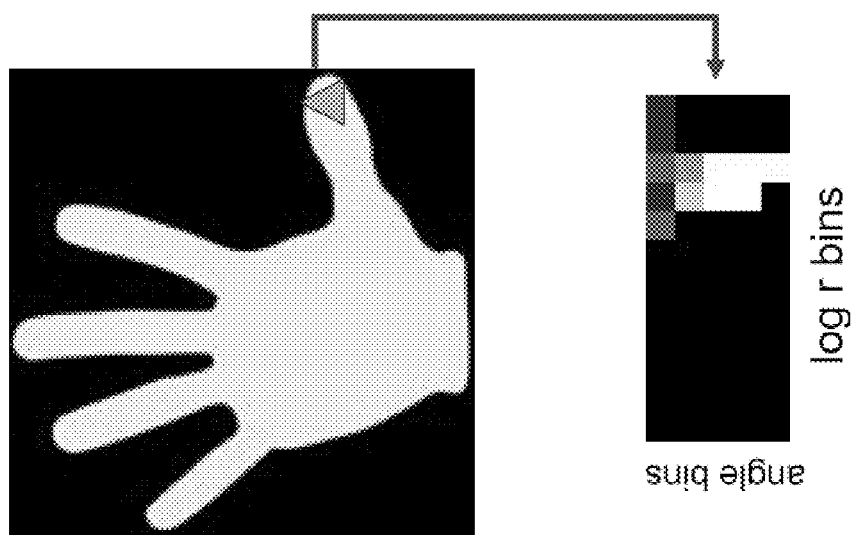
FIGURE 6

BODY FEATURE DETECTION AND HUMAN POSE ESTIMATION USING INNER DISTANCE SHAPE CONTEXTS

RELATED APPLICATIONS

This application claims the benefit of U.S. Provisional Application No. 61/155,439, filed Feb. 25, 2009, the content of which is incorporated by reference herein in its entirety. This application is related to U.S. patent application Ser. No. 12/455,257, filed May 29, 2009, titled "Controlled Human Pose Estimation From Depth Image Streams", U.S. patent application Ser. No. 12/317,369, filed Dec. 19, 2008, entitled "Controlled Human Pose Estimation From Depth Image Streams", and U.S. patent application Ser. No. 12/709,287, filed concurrently with this application, titled "Capturing and Recognizing Hand Postures Using Inner Distance Shape Contexts", all of which are incorporated by reference herein in their entirety.

BACKGROUND

Field of Disclosure

The disclosure generally relates to the field of tracking motion of a system, and more specifically, to feature detection and pose estimation from visual input.

Description of the Related Art

Recovering human pose from visual observations is a challenging problem in the field of computer vision because of the complexity of the models which relate observation with pose. An effective solution to this problem has many applications in areas such as video coding, visual surveillance, human gesture recognition, biomechanics, video indexing and retrieval, character animation, and man-machine interaction. See D. Gavrila, "The visual analysis of human movement: a survey", *Computer Vision and Image Understanding*, 73(1):82-98 (1999); see also L. Wang, W. Hu, and T. Tan, "Recent developments in human motion analysis" *Pattern Recog.*, 36(3):585-601 (2003); see also T. B. Moeslund, A. Hilton, and V. Kruger, "A survey of advances in vision-based human motion capture and analysis", *Computer Vision and Image Understanding*, 104(2,3):90-126 (2006), all of which are incorporated by reference herein in their entirety.

One of the major difficulties in estimating pose from visual inputs involves the recovery of the large number of degrees of freedom in movements which are often subject to kinematic constraints such as joint limit avoidance, and self penetration avoidance between two body segments. Such difficulties are compounded with insufficient temporal or spatial resolution, ambiguities in the projection of human motion onto the image plane, and when a certain configuration creates self occlusions. Other challenges include the effects of varying illumination and therefore appearance, variations of appearance due to the subject's attire, required camera configuration, and real time performance for certain applications.

Traditionally there are two categories of approaches in solving the pose estimation problem, model based approaches and learning based approaches. Model-based approaches rely on an explicitly known parametric human model, and recover pose either by inverting the kinematics from known image feature points on each body segment (See C. Barron and I. A. Kakadiaris, "Estimating anthropometry and pose from a single image", *Computer Vision and Pattern Recognition*, 1:669-676 (2000); see also C. J. Taylor, "Reconstruction of articulated objects from point correspondences in a single uncalibrated image", *Computer Vision and Image Understanding*, 80(3):349-363 (2000), both of which are incorporated by reference herein in their entirety), or by searching high dimensional configuration spaces which is typically formulated deterministically as a nonlinear optimization problem (See J. M. Rehg and T. Kanade, "Model-based tracking of selfoccluding articulated objects", *ICCV*, pages 612-617 (1995), the content of which is incorporated by reference herein in its entirety), or probabilistically as a maximum likelihood problem (See H. Sidenbladh, M. J. Black, and D. J. Fleet, "Stochastic tracking of 3D human figures using 2D image motion", *ECCV*, pages 702-718, (2000), the content of which is incorporated by reference herein in its entirety). The model-based approaches typically require good initialization, high dimensional feature points, and are computationally intensive. In addition, the model-based approaches generally do not enforce bodily constraints such as joint limitation and self penetration avoidance, they often generate erroneous estimation results.

In contrast, learning based approaches directly estimate body pose from observable image quantities. See A. Agarwal and B. Triggs, "Recovering 3d human pose from monocular images", *IEEE Trans. on Pattern Analysis and Machine Intelligence*, 28(1):44-58 (2006), see also G. Mori and J. Malik, "Recovering 3d human body configurations using shape contexts", *IEEE Trans. on Pattern Analysis and Machine Intelligence*, 28(7):1052-1062 (2006), both of which are incorporated by reference herein in their entirety. In example based learning, inferring pose is typically formulated as a k-nearest neighbors search problem where the input is matched to a database of training examples whose three-dimensional (3D) pose is known. Computational complexity of performing similarity search in high dimensional spaces and on very large data sets has limited the applicability of these approaches. Although faster approximate similarity search algorithms have been developed based on Locally-Sensitive Hashing, computation speed remains a challenge with learning based approaches. See G. Shakhnarovich, P. Viola, and T. Darrell, "Fast pose estimation with parameter sensitive hashing", *ICCV*, 2:750-757 (2003), the content of which is incorporated by reference herein in its entirety. Similar to the model based approaches, the learning based approaches also tend to be computationally intensive. In addition, in order for a pose to be properly recognized using a learning based approach, a system must process ("learn") the pose before hand. Thus, generally only a small set of pre-programmed human pose can be recognized using the learning based approaches.

Hence, there is lacking, inter alia, a system and method for efficiently and accurately detecting body features and estimating human pose in real time.

SUMMARY

Embodiments of the present invention provide a method (and corresponding system and computer program product) for feature detection and pose estimation of human actors. According to one aspect, feature points are detected in a depth image of the human actor. A human figure silhouette is segmented from the depth image. Contour points are sampled along the human figure silhouette. Inner Distance Shape Context (IDSC) descriptors of the sample contour points are determined and compared to IDSC descriptors of known feature points in an IDSC gallery. Feature points are identified among the sample contour points based on the similarities of their IDSC descriptors and those of the feature points in the IDSC gallery.

According to another aspect, the method compares the differences between IDSC descriptors of sample contour points and those of feature points in the IDSC gallery to a threshold value. If the differences between the IDSC descriptors of all sample contour points and a particular feature point exceed the threshold value, then that particular feature point is deemed missing in the depth image. On the other hand, if the threshold value exceeds the differences between the IDSC descriptors of multiple sample contour points and those of a particular feature point, then each of the multiple sample contour points is identified as a candidate for that particular feature point in the depth image.

According to still another aspect, the method augments missing feature points and selects feature points among candidates based on previously generated corresponding predicted feature points. The method further estimates a pose of a human model based on the detected feature points, the augmented feature points, and kinematic constraints of the human model.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIG. 6 is a diagram illustrating characters of Inner Distance Shape Context (IDSC) descriptors in accordance with one embodiment of the invention.

DETAILED DESCRIPTION

The present invention provides a system (and corresponding method and computer program product) for detecting features and estimating poses of a motion generator in real time. The system detects key features in visual input of the generator, and reconstructs the pose of the generator on a model based on the detected features. The system also makes predictions of feature positions and utilizes the predictions to resolve ambiguities when multiple feature candidates are detected, and to estimate intermittently missing or occluded features.

For the sake of illustration, without loss of generality, this description assumes that the motion generator is a human actor and the model represents a human model that is configured based on a structure of the human actor to resemble a body pose of the human actor. Those of skill in the art will recognize that the techniques described herein can be utilized to estimate poses of other motion generators such as animals, for example.

The Figures (FIGS.) and the following description relate to embodiments of the present invention by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Figure 1:
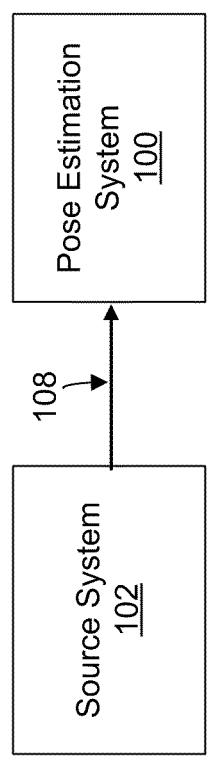
FIG. 1 is a block diagram illustrating a pose estimation system for estimating pose of a motion generator in a source system in accordance with one embodiment of the invention.

FIG. 1 is a block diagram illustrating a pose estimation system 100 for detecting features and estimating poses of a human actor in a source system 102. The source system 102 generates a series of visual images of the human actor and transmits them to the pose estimation system 100 in an image stream 108. In one embodiment, the source system 102 utilizes a camera such as a time-of-flight camera (also called a TOF camera, a time-of-flight range image sensor) to continuously capture poses of the human actor and transmits a depth image stream 108 to the pose estimation system 100. The pose estimation system 100 detects key features in the received image stream 108 and reconstructs the human actor's pose in a human model.

In addition to or instead of providing human pose estimation, the pose estimation system 100 may be used for other purposes such as motion retargeting, tracking and estimation, and joint torque estimation in biomechanics. In motion retargeting, the pose estimation system 100 generates motion descriptors of the source system 102 based on the reconstructed poses, and transmits the motion descriptors to a motion retargeting system, which generates joint variables for controlling the motion of a target system to simulate the motion in the source system 102. Further information of motion retargeting is found in U.S. application Ser. No. 11/734,758, filed Apr. 12, 2007, titled "Control Of Robots From Human Motion Descriptors", the content of which is incorporated by reference herein in its entirety.

System Architecture

Figure 2:
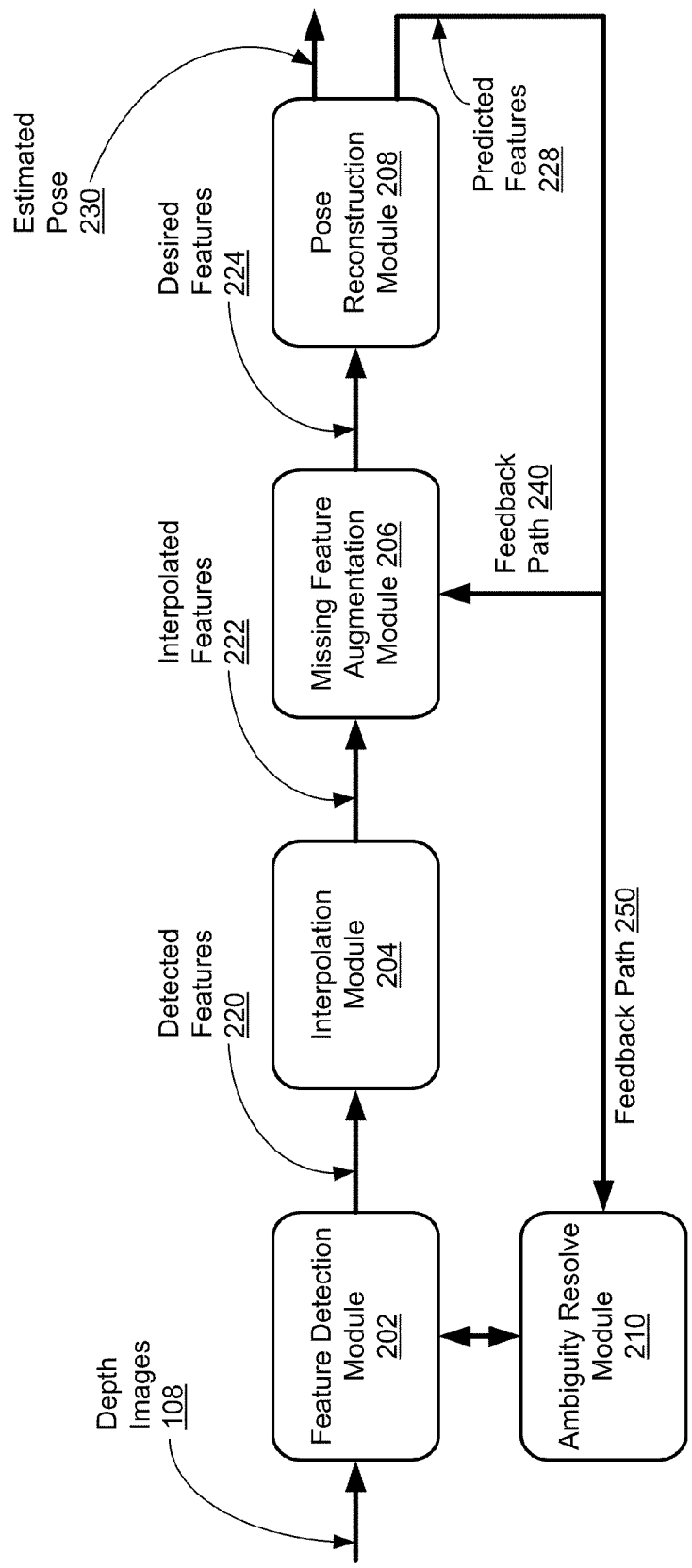
FIG. 2 is a block diagram illustrating a configuration of the pose estimation system shown in FIG. 1 in accordance with one embodiment of the invention.
Figure 5:
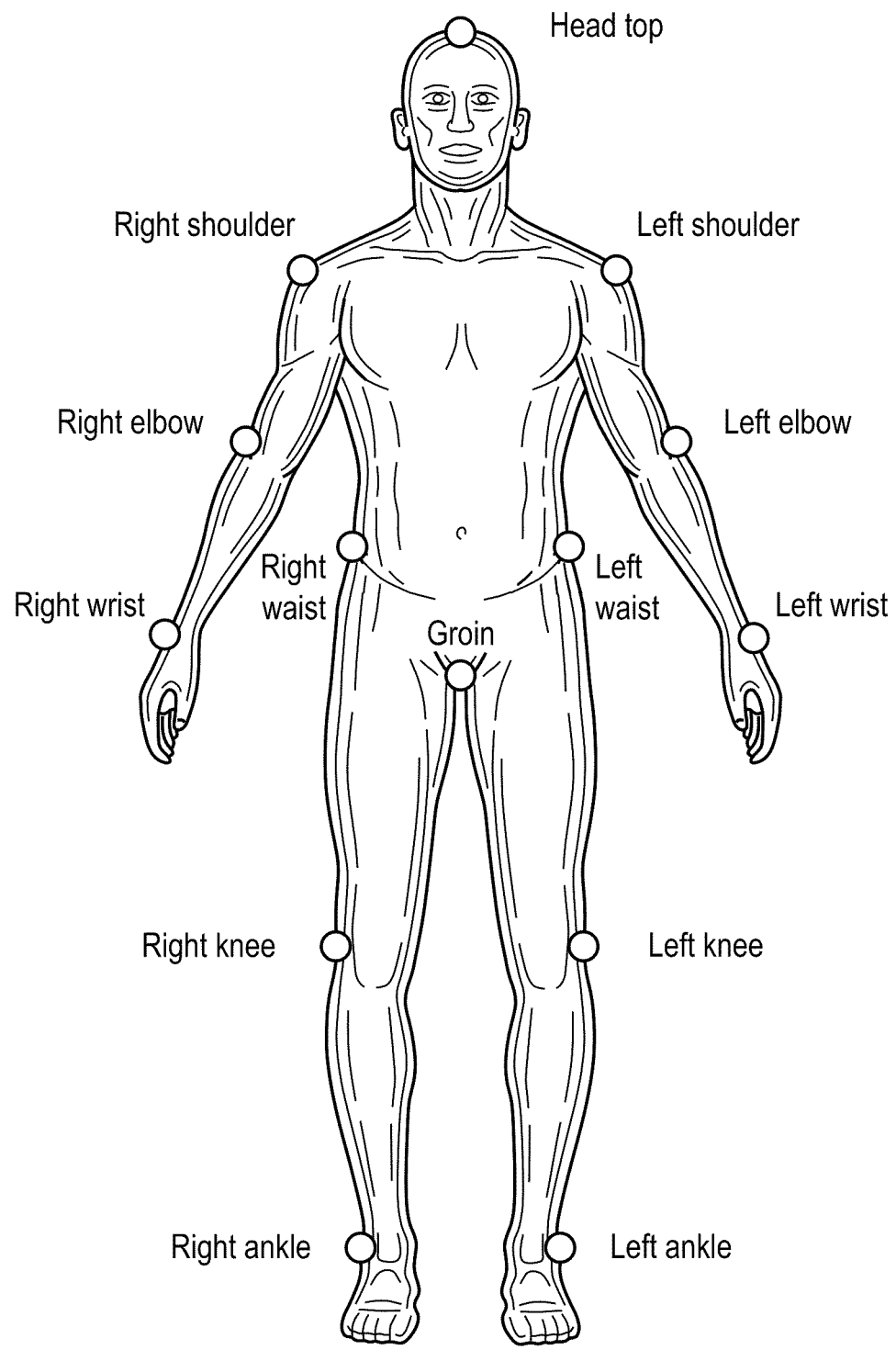
FIG. 5 is a diagram illustrating a human model in accordance with one embodiment of the invention.

FIG. 2 is a block diagram illustrating a configuration of the pose estimation system 100 for detecting body features and estimating human poses according to one embodiment. The pose estimation system 100 reconstructs body poses of a human actor from multiple features detected in the depth image stream 108. The features (or feature points, anatomical features, key points) correspond to 3D positions of prominent anatomical landmarks on the human body. Without loss of generality, the pose estimation system 100 tracks fourteen (k=14) such body features as illustrated in FIG. 5. As shown, the fourteen features are head top, left shoulder, right shoulder, left elbow, right elbow, left wrist, right wrist, left waist, right waist, groin, left knee, right knee, left ankle, and right ankle. The reconstructed (or estimated) human pose q is described in the human model that tracks the human actor's pose. In one embodiment, the human model is a human anatomical model that closely resembles the body of the human actor.

As shown in FIG. 2, the pose estimation system 100 comprises a feature detection module (also called a keypoint detection module) 202, an interpolation module 204, a missing feature augmentation module 206, a pose reconstruction module (also called a constrained closed loop inverse kinematics module) 208, and an ambiguity resolve module 210.

The feature detection module 202 is configured to receive the depth image stream 108, detect features in the depth image stream 108, and output the detection results. Due to occlusions, unreliable observations, or low confidence in the detection results, the actual number of detected features for a particular image frame, denoted by m (m=0 . . . k), may be fewer than k. The detected features are represented by a position vector $p_{det}$ 220, which is formed by concatenating the 3D position vectors corresponding to the individual detected features. As described in detail below with relation to FIG. 4, the feature detection module 202 first samples contour points on human silhouettes segmented from frames in the depth image stream 108, and then detects feature points in the sample contour points by comparing their Inner Distance Shape Context (IDSC) descriptors with IDSC descriptors of known feature points for similarity.

The interpolation module 204 is configured to low pass filter the vector $p_{det}$ 220 received from the feature detection module 202 and generate interpolated features $\bar{p}_{det}$ 222. In one embodiment, the depth images transmitted to the pose estimation system 100 is captured at approximately 15 frames per second using a TOF camera (e.g., a Swiss Ranger SR-3000 3D time of flight camera). For stability in numerical integrations performed in the pose reconstruction module 208 in subsequent modules, the interpolation module 204 re-samples the detected features to a higher rate (e.g., 100 HZ) and represented by the vector $\bar{p}_{det}$ 222.

The missing feature augmentation module 206 is configured to augment $\bar{p}_{det}$ with positions of features missing in the depth image stream 108 and generate desired (or augmented) feature vector, denoted by $p_d$ 224. As noted above, the number of detected features at each frame may be fewer than fourteen (i.e. m<k=14) due to occlusions or unreliable observations. The missing feature augmentation module 206 receives the predicted features p 228 from the pose reconstruction module 208 through a feedback path 240 and utilizes p 228 to augment the missing features. The augmented features $p_d$ 224 represents the k=14 desired features used as input to the pose reconstruction module 208.

The pose reconstruction module 208 is configured to generate estimated poses q 230 and predicted features p 228 based on $p_d$ 224, the accurate human model, and its constraints. The pose reconstruction module 208 is further configured to transmit p 228 to the missing feature augmentation module 206 and the ambiguity resolve module 210 to resolve subsequent ambiguities and to estimate intermittently missing or occluded features. The estimated (or reconstructed, recovered) pose, parameterized by the vector q 230, describes the predicted motion and pose of all n degrees of freedom in the human model. The predicted features p 228 are fed-back to the missing feature augmentation module 206 to augment intermittently missing or occluded features, and to the ambiguity resolve module 210 to resolve ambiguities in case multiple feature candidates are detected.

The ambiguity resolve module 210 is configured to resolve ambiguities when the feature detection module 202 detects multiple possible feature candidates. The ambiguity resolve module 210 receives the predicted features p 228 from the pose reconstruction module 208 through a feedback path 250 and utilizes p 228 to resolve the ambiguities. For example, p 228 may indicate that the hypothesized location of one candidate for a feature (i.e., from the feature detection module 202) is highly improbable, causing the ambiguity resolve module 210 to select another candidate of the feature as the detected feature. As another example, the ambiguity resolve module 210 may choose the feature candidate that is closest to the corresponding predicted feature to be the detected feature. Alternatively or additionally, the ambiguity resolve module 210 may use the predicted feature as the detected feature.

The pose estimation system 100, or any of its components described above, may be configured as software (e.g., modules that comprise instructions executable by a processor), hardware (e.g., an application specific integrated circuit), or a combination thereof. The software and/or hardware may operate in a computer system that is structured to include a processor, memory, computer-readable storage medium (e.g., hard drive), network interfaces, and applicable operating system and other functional software (e.g., network drivers, communication protocols). Those of skill in the art will recognize that other embodiments can have different and/or additional modules than those shown in FIG. 2. Likewise, the functionalities can be distributed among the modules in a manner different than described herein. Further, some of the functions can be provided by entities other than the pose estimation system 100.

System Operation

Figure 3:
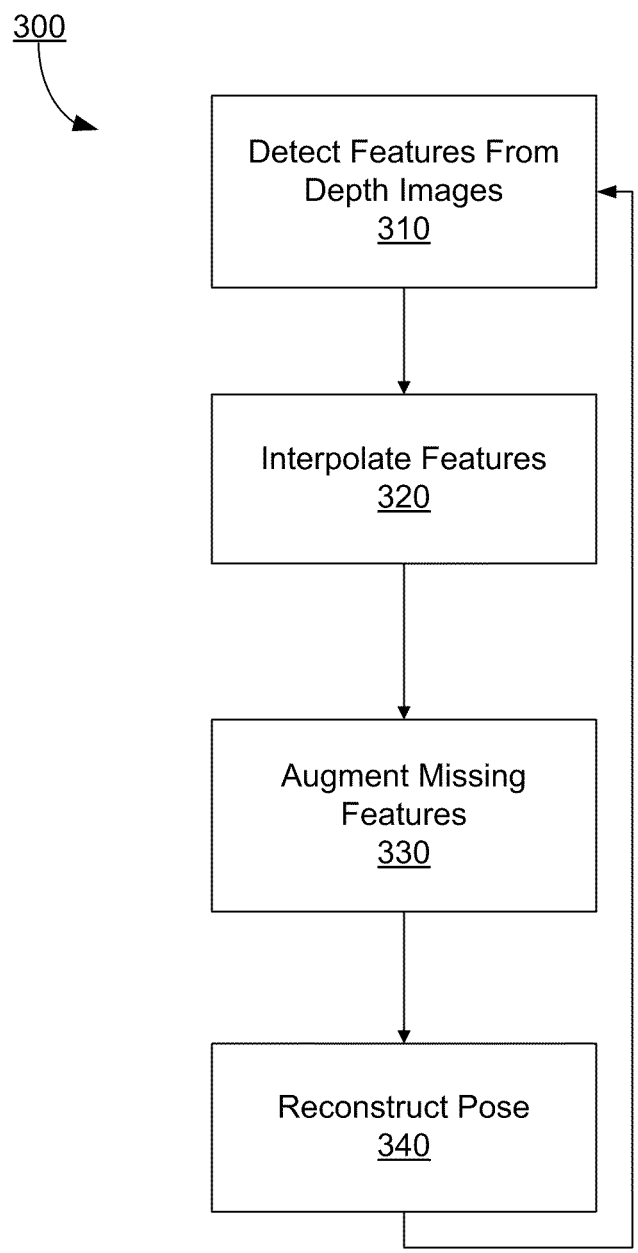
FIG. 3 is a flow diagram illustrating a pose estimation process in accordance with one embodiment of the invention.

FIG. 3 is a flowchart illustrating an example process of the pose estimation system 100 for estimating human body pose in accordance with one embodiment of the invention.

The pose estimation system 100 (or the feature detection module 202) detects 310 body features of the human actor in the depth image stream 108. In one embodiment, the pose estimation system 100 detects 310 the features in an image frame by first segmenting a human silhouette from the image frame, and then sampling contour points on the human silhouette. The pose estimation system 100 identifies feature points in the sample contour points by comparing their IDSC descriptors with those of known feature points for similarity. The process to detect 310 the features are described in further detail below with relation to FIG. 4. When multiple feature candidates are detected, the pose estimation system 100 utilizes the previously generated predicted features p to resolve ambiguities.

The pose estimation system 100 (or the interpolation module 204) interpolates 320 the detected features $p_{det}$ to re-sample the data to a higher rate (e.g., 100 Hz). In one embodiment, the pose estimation system 100 interpolates 320 the detected features using a local cubic spline interpolation routine. The interpolation is performed to ensure stability of numerical integrations performed in the pose reconstruction module 208. In one embodiment, the pose estimation system 100 low-pass filters the detected features $p_{det}$ before interpolating the filtered features.

The pose estimation system 100 (or the missing feature augmentation module 206) augments 330 the interpolated features $\bar{p}_{det}$ with positions of undetected features and generates augmented feature vector $p_d$. As noted above, the pose estimation system 100 may detect less than fourteen body features at each frame due to occlusions or unreliable observations. The pose estimation system 100 estimates those undetected features using previously generated predicted features p. If m<k, the detected features are augmented with (k−m) predicted features p obtained from forward kinematics computations of the reconstructed pose.

The pose estimation system 100 (or the pose reconstruction module 208) reconstructs 340 the observed body pose q of the human actor in a human model and predicts subsequent features (or feature point positions) p. The predicted position of each feature is described by the vector $p_i$ and referenced to a base frame corresponding to a waist joint coordinate system. In one embodiment, the pose estimation system 100 reconstructs 340 human pose by tracking the observed features and prioritizing features according to their importance or level of confidence. The pose estimation system 100 predicts subsequent features by enforcing kinematic constraints of the human model, such as joint limitations and self penetration avoidance.

The pose estimation system 100 expresses the observed and predicted features in Cartesian space. These features do not necessarily define the degrees of freedom required to fully describe the motion of the human model. For an n degree of freedom human model, the configuration space, or joint space, described here by vector $q=[q_1, \ldots, q_n]^T$, fully characterizes the motion of the human model. The mapping between configuration space velocities and Cartesian space velocities is obtained by considering the differential kinematics relating the two spaces, $$\dot{p}_i = J_i(q)\dot{q} \quad (1)$$

where $J_i \in \Re^{3 \times n}$ is the Jacobian of the $i_{th}$ feature and $\dot{p}_i$ is the velocity of $p_i$. See J. J. Craig, "Introduction to robotics, mechanics and control", *Addison-Wesley*, 2nd edition (1989), the content of which is incorporated by reference herein in its entirety.

One or more portions of the method 300 may be implemented in embodiments of hardware and/or software or combinations thereof. For example, the method 300 may be embodied through instructions for performing the actions described herein and such instrumentations can be stored within a tangible computer readable medium (e.g., flash memory, RAM, nonvolatile magnetic storage device) and are executable by a computer processor. Furthermore, those of skill in the art will recognize that other embodiments can perform the steps of the method 300 in a different order. Moreover, other embodiments can include different and/or additional steps than the ones described here. The pose estimation system 100 can perform multiple instances of the steps of method 300 concurrently and/or perform steps in parallel.

Feature Detection and Tracking

Figure 4:
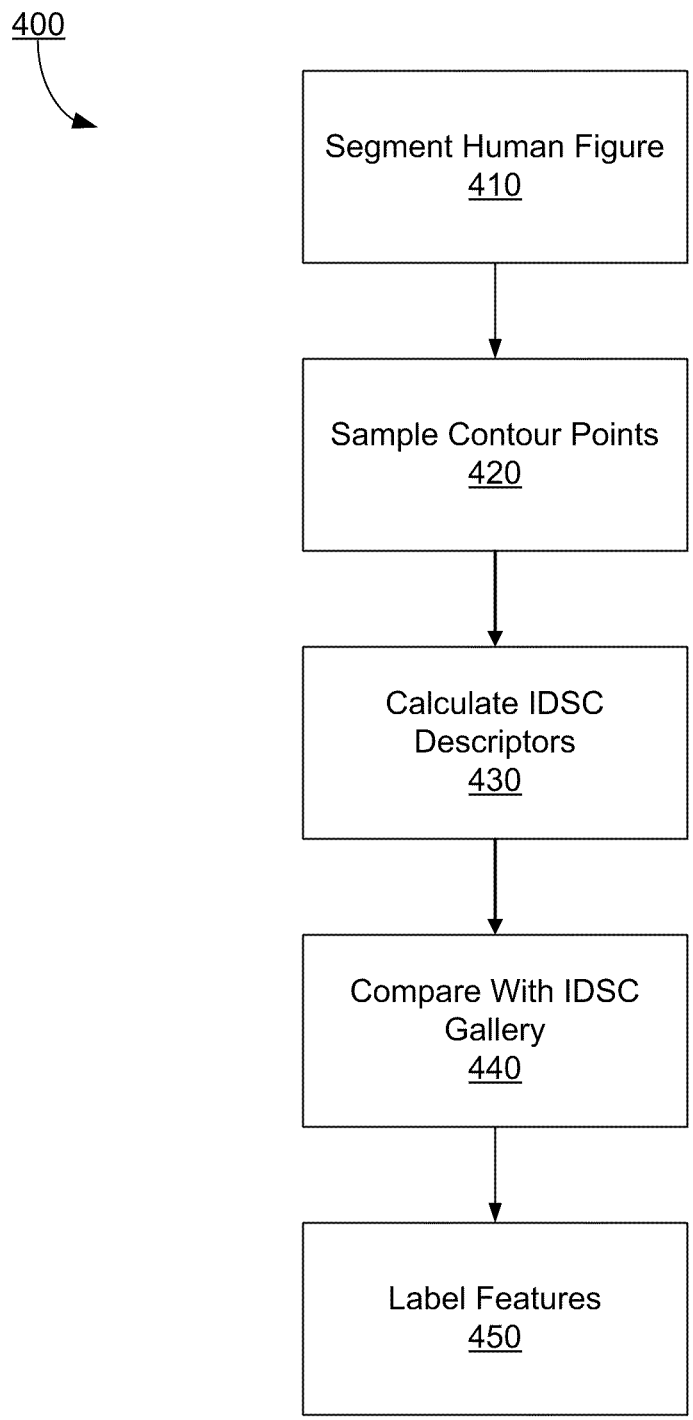
FIG. 4 is a flow diagram illustrating a feature point detection process in accordance with one embodiment of the invention.

Referring to FIG. 4, a flow diagram describing a process 400 of the pose estimation system 100 (or the feature detection module 202) for detecting body features in a depth image stream in accordance with one embodiment of the invention. As shown, the pose estimation system 100 segments 410 the human figure (hereinafter called the human silhouette) from the background, and samples 420 contour points on the human silhouette in the depth image stream. The pose estimation system 100 calculates 430 Inner Distance Shape Context (IDSC) descriptors of the sample contour points, and compares 440 the calculated IDSC descriptors with IDSC descriptors of known feature points in an IDSC gallery. For each feature point, the pose estimation system 100 labels 450 a sample contour point with an IDSC descriptor that is most similar to an IDSC descriptor of that feature point as the corresponding feature point in the current image frame.

The steps of the process 400 are described in further detail below. Even though the described process 400 detects body features in a depth image stream, one skilled in the art will readily recognize from the following description that alternative embodiments of the process may detect body features in other types of image streams, such as a regular two dimensional image stream, without departing from the principles described herein.

Human Silhouette Segmentation

The pose estimation system 100 separates image regions of the human figure (also called the human silhouette, the foreground) from image regions of the background through the human silhouette segmentation process 410. Examples of the background clutters to be separated from the foreground include the floor and other objects that are beyond the depth working volume.

According to one embodiment, the foreground is assumed to occupy a depth volume of interest (or the depth working volume) which is set to $[0, Z_{max}]$. The pose estimation system 100 identifies image coordinates with depth values that lie outside this volume of interest (i.e., $(Z_{max}, \infty]$) as background. The pose estimation system 100 can also perform morphological operations to remove salt-and-pepper noise during this process.

According to one embodiment, the floor is assumed to occupy the image regions where depth image normal vectors point proximately in the vertical direction. The pose estimation system 100 segments 410 the floor from the foreground by first estimating normal vectors at each pixel in the depth image and then segmenting 410 those image coordinates with vertical normal vectors. The pose estimation system 100 can take into account margin for error due to noise during this process.

The pose estimation system 100 obtains the image of the foreground by removing the image of the background identified above from the depth image stream.

Contour Point Sampling and IDSC Descriptor Calculation

Shape context is a descriptor used to measure similarity and point correspondences between shapes. See S. Belongie, J. Malik, and J. Puzicha, "Shape Matching and Object Recognition Using Shape Contexts", *IEEE Trans. Pattern Analysis and Machine Intel. (PAMI)*, 509-522 (2002), the content of which is incorporated by reference herein in its entirety. The shape context of an object describes each point along the object's contour with respect to all other points in the contour. If there are n points on the contour of a shape. The shape context of a point $p_i$ is the coarse histogram $h_i$ of the relative coordinates of the remaining n−1 points as defined in the following equation:

$$h_i(k) = \#\{q \neq p_i : (q - p_i) \in \text{bin}(k)\}, \quad (2)$$

where k represents the index of the histogram bin, and the notation #{•} represents the number of points defined inside the parenthesis. The histogram is computed based on both distance and angle for each point on the contour, with respect to all other points on the contour. The bins are normally taken to be uniform in log-polar space.

Inner Distance Shape Context (IDSC) is an extension of the original shape context. See H. Ling and D. W. Jacobs, "Shape Classification Using the Inner-Distance", *IEEE Trans. Pattern Analysis and Machine Intel. (PAMI)*, 286-299 (2007), the content of which is incorporated by reference herein in its entirety. Similar to the shape context, the IDSC is a histogram of the contour points in the log-polar space that describes how each point is related to all other contour points in terms of distance and angle. The IDSC primarily differs from the shape context in the way the distance and angle between the contour points are computed. The shape context descriptor uses a normal Euclidean distance measure, whereas the IDSC descriptor computes an inner distance between the points along a shortest path that travels within the object's contour. The angular relation in IDSC was also measured interior to the object's contour, termed as the inner angle. The inner angle is defined as the angle between the contour tangent at the start point and the direction of the inner distance originating from it. The IDSC descriptor is computed by applying the inner distance and the inner angle to Equation 2.

The pose estimation system 100 samples 420 N points along the contour of the segmented human silhouette, and calculates (or determines) 430 an IDSC descriptor for each of the sample contour points relative to all other sample contour points in terms of the inner distances and the inner angles by applying Equation 2. The sampled contour points are denoted by $x_i$ and the corresponding IDSC descriptors are represented by $IDSC(x_i)$, where $i=1, \ldots, N$. In one embodiment, the contour points are sampled 420 evenly (or uniformly) along the contour of the human figure.

Feature Point Identification

Given two images of the same object under different articulations, the IDSC descriptors of the contour points belonging to the same part of the object are similar (as shown by the points denoted by symbol Δ on the thumb in two images in FIG. 6). Whereas, the points corresponding to different parts of the object have dissimilar IDSC descriptors (as illustrated by symbols Δ and + in FIG. 6).

Motivated by the above observation, feature points can be detected along the contour of a human silhouette by comparing 440 the IDSC descriptors of the sample contour points to those of known feature points for similarity. If an IDSC descriptor of a known feature point (e.g., as labeled in a different image) is more similar to the IDSC descriptor of a sample contour point comparing to those of the other sample contour points, that particular sample contour point can be identified as that particular feature point in the human silhouette and labeled 450 accordingly.

To facilitate feature detection using this approach, the pose estimation system 100 creates a gallery of IDSC descriptors of known feature points by manually localizing (or labeling) feature points (e.g., the 14 feature points shown in FIG. 5) in training images and calculating IDSC descriptors for these feature points in the training images. Specifically, the gallery (hereinafter called the IDSC gallery) is denoted by IDSC_Gallery(j,l), where $j=1, \ldots, k$, $l=1, \ldots, M$, with k denoting the number of known feature points and M denoting the number of training images covered by the IDSC gallery. The IDSC gallery can be expressed as a gallery matrix shown in the following equation:

$$\text{IDSC\_Gallery}(j, l) = \begin{bmatrix} IDSC_{1,1} & IDSC_{2,1} & \ldots & IDSC_{k,1} \\ IDSC_{1,2} & IDSC_{2,2} & \ldots & IDSC_{k,2} \\ \vdots & \vdots & \ddots & \vdots \\ IDSC_{1,M} & IDSC_{2,M} & \ldots & IDSC_{k,M} \end{bmatrix} \quad (3)$$

The sample contour point $x_i$ ($i=1, \ldots, N$) identified as the feature point $D_j$ ($j=1, \ldots, k$) is identified by $$D_j = \min_{i=1 \ldots N} \left( \min_{l \in S} (\|IDSC(x_i) - \text{IDSC\_Gallery}(j, l)\|) \right). \quad (4)$$

Equation 4 measures the bin-wise difference between two histograms, sums up the difference of all bins, and identifies the histogram pairs having the least total difference as the best matching result. Thus, for each of the feature points, the pose estimation system 100 identifies a sample contour point as the feature point in the current human silhouette, the IDSC descriptor of that identified sample contour point being more similar to one of the IDSC descriptors of the feature point in the IDSC gallery than those of all other sample contour points.

In one embodiment, the pose estimation system 100 compares the difference between the IDSC descriptor of a sample contour point and that of a known feature point to a configurable threshold value. If the difference exceeds the threshold value, the pose estimation system 100 determines that the sample contour point is distinguishable from the known reference point, even if the contour point would be identified as the known feature point by applying Equation 4. Thus, if the differences between the IDSC descriptors of a particular feature point in the IDSC gallery and all of the sample contour points exceed the threshold value, the pose estimation system 100 would not identify that particular feature point in the underlying image frame and deem it missing. On the other hand, if the differences between the IDSC descriptors of multiple sample contour points and that of a known feature point are all below the threshold value, the pose estimation system 100 may identify all such sample contour points as feature candidates for that particular feature point in the underlying image frame.

In one embodiment, multiple feature points can be used to represent a single body feature. For example, in addition to the head top feature point, the left ear and the right ear can also be used to identify the head in a human figure. The pose estimation system 100 can group the IDSC descriptors of these feature points together in the form of a cumulative IDSC descriptor and include in the IDSC gallery. When detecting the feature in a human silhouette, the pose estimation system 100 compares different combinations of IDSC descriptors of sample contour points with the cumulative IDSC descriptor for similarity, and identifies the group with IDSC descriptors most similar to the cumulative IDSC descriptor as the feature points associated with that feature.

The pose estimation system 100 labels 450 the identified feature points based on the matching feature point in the IDSC gallery. For example, if the IDSC descriptor of a sample contour point is determined to be the closest to the IDSC descriptor of the left shoulder in one of the gallery images, that particular sample contour point is labeled 450 as the left shoulder in the current image frame.

In addition to detecting feature points on the contour of a human silhouette, the process 400 can detect interior feature points (i.e., inside the human silhouette). For example, the pose estimation system 100 can identify the location of a waist center in a human figure by first identifying the left waist feature point and right waist feature point on the contour, and then derive the location of the waist center based on the location of the left and right waist feature points (e.g., the middle point in between). Similarly, the pose estimation system 100 can identify the head center based on the location of the two ears on the contour of the human silhouette.

Due to reasons such as occlusions, some of the feature points may be inside the human silhouette. For example, if the right arm is in front of the torso in the depth image, the right elbow and right wrist would be inside the human silhouette and not on the contour. In one embodiment, in addition to detecting feature points along the contour of the human silhouette, the pose estimation system 100 applies additional techniques to detect feature points that fall inside the human silhouette, such as skeleton analysis and depth slicing analysis. Further information of the additional techniques for detecting features in the human figure is found in U.S. patent application Ser. No. 12/455,257, filed May 29, 2009, titled "Controlled Human Pose Estimation From Depth Image Streams", and U.S. patent application Ser. No. 12/317,369, filed Dec. 19, 2008, entitled "Controlled Human Pose Estimation From Depth Image Streams", both of which are incorporated by reference herein in their entirety. The feature points detected using different approaches can be treated as possible feature candidates and fed to the ambiguity resolve module 210 for selection. In addition, the pose estimation system 100 may augment the detected features with predicted features p obtained from forward kinematics computations of the reconstructed pose.

Once the body features in the human figure are detected, the pose estimation system 100 can readily use the detected features for purposes such as estimating human pose, segmenting body regions, and recognizing body segment postures such as hand shapes. Further information for segmenting hand regions and recognizing hand postures is found in U.S. patent application Ser. No. 12/709,287, filed concurrently with this application, titled "Capturing and Recognizing Hand Postures Using Inner Distance Shape Contexts", the content of which is incorporated by reference herein in its entirety.

Pose Estimation and Feature Prediction

The pose estimation system 100 (or the pose reconstruction module 208) reconstructs 340 the observed body pose q of the human actor and predicts subsequent features positions p. In one embodiment, the pose estimation system 100 reconstructs 340 q by prioritizing features according to their importance (or confidence) and tracking the observed poses (Cartesian tracking control). In addition, the pose estimation system 100 predicts subsequent feature positions by enforcing kinematic constraints of the human model, such as joint limitations and self penetration avoidance, which may be categorized as joint limit avoidance (for joint body segments) and self penetration avoidance (for unconnected body segments). These operations are described in detail below.

Cartesian Tracking Control

In one embodiment, the pose estimation system 100 applies a control policy (called Cartesian tracking control) that produces the joint variables (q) such that the Cartesian error between the estimated features and the desired (from observations) features are minimized. The tracking performance is subject to the human model kinematic constraints as well as the execution of multiple and often conflicting feature tracking requirements. In one embodiment, the pose estimation system 100 employs a tracking control approach based on a Cartesian space kinematic control method known as closed loop inverse kinematics (CLIK). The basis for the solution of the CLIK algorithm is the inversion of the differential kinematics relating Cartesian variables and joint variables as described by Equation 1. For simplicity, the superscript i with reference to the $i_{th}$ feature is temporarily omitted in the present section.

Let the desired variables be denoted by a subscript d. The joint velocities may be computed by inverting Equation 1 and adding a feedback error term to correct for numerical drift.

$$\dot{q}=J^*(\dot{p}_d+Ke), \quad (5)$$

where $J^*$ denotes the regularized right pseudo-inverse of J weighted by the positive definite matrix $W_1$, $$J^*=W_1^{-1}J^T(JW_1^{-1}J^T+\lambda^2 I)^{-1}. \quad (6)$$

The parameter $\lambda>0$ is a damping term, and I is an identity matrix. The vector $\dot{p}_d$ corresponds to the desired feature velocity. The matrix K is a diagonal 3×3 positive definite gain matrix, and e is a vector that expresses the position error between the observed and computed features. The position error is simply defined as $e=p_d-p$, where $p_d$ and p correspond to the observed and computed feature positions, respectively.

Managing Multiple Features

In one embodiment, the pose estimation system 100 (or the pose reconstruction module 208) prioritizes features according to their importance or the level of confidence in the observations. For example, since elbow positions are difficult to detect, they may be designated as secondary features while others are designated as primary features.

The formulation above considers estimation of human pose from a single feature. Multiple features can be handled in two ways, namely by augmentation or prioritization. These methods are described in detail in robot motion control literature. See B. Siciliano and J. Slotine, "A general framework for managing multiple tasks in highly redundant robotic systems", *International Conference on Advanced Robotics*, volume 2, pages 1211-1216, Pisa, Italy (1991), the content of which is incorporated by reference herein in its entirety. In one embodiment, the pose estimation system 100 utilizes feature augmentation which refers to the concatenation of the individual spatial velocities and the associated Jacobian matrix and feedback gain matrix.

Let i (i=1 ... k) be the index of the $i_{th}$ feature $\dot{p}_i$ and the associated Jacobian $J_i$. The pose estimation system 100 forms a 3k×1 augmented spatial velocity vector $\dot{p}$ and a 3k×n augmented Jacobian matrix J as follows, $$\dot{p}=[\dot{p}_1^T \ldots \dot{p}_i^T \ldots \dot{p}_k^T]^T, \quad (7)$$

$$J=[J_1^T \ldots J_i^T \ldots J_k^T]^T. \quad (8)$$

Likewise, $\dot{p}_d$ in the augmented space is the concatenation of the individual feature velocity vectors. The solution of tracking control algorithm in the augmented system follows the same way as that previously described by Equation 5. The tracking error rate for each element of a feature can be controlled by the augmented feedback gain matrix K, which represents a 3k×3k diagonal matrix in the augmented space. The trajectory tracking error convergence rate depends on the eigenvalues of the feedback gain matrix in Equation 5: the larger the eigenvalues, the faster the convergence. In one embodiment, the function is implemented as discrete time approximation of the continuous time system. Therefore, it is reasonable to predict that an upper bound exists on the eigenvalues, depending on the sampling time. A particular feature or its individual components can be more tightly tracked by increasing the eigenvalue of K associated with that direction. By modulating the elements of K, the pose estimation system 100 can effectively encode the relative level of confidence observed. Measurements with higher confidence will be assigned higher feedback gain values.

Constrained Closed Loop Inverse Kinematics

The pose estimation system 100 takes into account human model kinematic constraints in tracking the detected human poses in the human model. Example kinematic constraints include joint limits and self penetration constraints. A constrained closed loop inverse kinematics algorithm (CCLIK) that integrates such kinematic constraints into the CLIK formulation is described in detail in the following sections.

Joint Limit Avoidance Constraints

In one embodiment, joint limit avoidance is achieved in the pose estimation system 100 by the proper selection of the weighting matrix $W_1$ in Equation 6. One example weighting matrix is defined by the Weighted Least-Norm (WLN) solution. The WLN solution was originally proposed by T. F. Chan and R. V. Dubey, "A weighted least-norm solution based scheme for avoiding joint limits for redundant joint manipulators", IEEE Transactions on Robotics and Automation, 11(2), (1995), the content of which is incorporated by reference herein in its entirety. A WLN solution is formulated in the context of Damped Least Squares Jacobian inverse. The WLN solution is utilized to generate an appropriate weighting matrix based on the gradient of a joint limit function to dampen joints nearing their limits. This solution is described below.

A candidate joint limit function that has higher values when the joints near their limits and tends to infinity at the joint limits is denoted by $H(q)$. One such candidate function proposed by Zghal et al. is given by $$H(q) = \frac{1}{4}\sum_{i=1}^{n} \frac{(q_{i,max} - q_{i,min})^2}{(q_{i,max} - q_i)(q_i - q_{i,min})}, \quad (9)$$

where $q_i$ represents the generalized coordinates of the $i_{th}$ degree of freedom, and $q_{i,min}$ and $q_{i,max}$ are the lower and upper joint limits, respectively. See H. Zghal and R. V. Dubey, "Efficient gradient projection optimization for manipulators with multiple degrees of redundancy", *Int. Conf. Robotics and Automation*, volume 2, pages 1006-1011 (1990), the content of which is incorporated by reference herein in its entirety. The upper and lower joint limits represent the more conservative limits between the physical joint limits and the virtual joint limits used for collision avoidance. Note that $H(q)$ is normalized to account for the variations in the range of motion. The gradient of H, denoted as $\nabla H$, represents the joint limit gradient function, an n×1 vector whose entries point in the direction of the fastest rate of increase of H.

$$\nabla H = \frac{\partial H}{\partial q} = \left[\frac{\partial H}{\partial q_1}, \ldots, \frac{\partial H}{\partial q_n}\right]. \quad (10)$$

The element associated with joint i is given by, $$\frac{\partial H(q)}{\partial q_i} = \frac{(q_{i,max} - q_{i,min})^2(2q_i - q_{i,max} - q_{i,min})}{4(q_{i,max} - q_i)^2(q_i - q_{i,min})^2}. \quad (11)$$

The gradient $$\frac{\partial H(q)}{\partial q_i}$$

is equal to zero if the joint is at the middle of its range and goes to infinity at either limit. The joint limit gradient weighting matrix, denoted by $W_{JL}$, is defined by the following n×n diagonal matrix with diagonal elements $w_{JLi}$ (i=1 ... n):

$$W_{JL} = \begin{bmatrix} w_{JL1} & 0 & 0 & 0 \\ 0 & w_{JL2} & 0 & 0 \\ 0 & 0 & \ddots & 0 \\ 0 & 0 & 0 & w_{JLn} \end{bmatrix}. \quad (12)$$

The weighting matrix $W_1$ in Equation 6 is constructed by $W_{JL}$ (e.g., $W_1=W_{JL}$). The diagonal elements $w_{JLi}$ are defined by:

$$w_{JLi} = \begin{cases} 1 + \left|\frac{\partial H}{\partial q_i}\right| & \text{if } \Delta|\partial H/\partial q_i| \geq 0 \\ 1 & \text{if } \Delta|\partial H/\partial q_i| < 0 \end{cases}. \quad (13)$$

The term $\Delta|\partial H/\partial q_i|$ represents the change in the magnitude of the joint limit gradient function. A positive value indicates the joint is moving toward its limit while a negative value indicates the joint is moving away from its limit. When a joint moves toward its limit, the associated weighting factor described by the first condition in Equation 13, becomes very large causing the motion to slow down. When the joint nearly reaches its limit, the weighting factor is near infinity and the corresponding joint virtually stops. If the joint is moving away from the limit, there is no need to restrict or penalize the motions. In this scenario, the second condition in Equation 13 allows the joint to move freely. Therefore, $W_{JL}$ can be used for joint limit avoidance.

Self Penetration Avoidance

Self penetration avoidance may be categorized as one of two types: 1) penetration between two connected segments, and 2) penetration between two unconnected segment pairs. By connected segment pairs, it is implied that the two segments are connected at a common joint and assumed that the joint is rotational.

If two segments are connected at a common rotational joint, i.e. connected segments, self collision may be handled by limiting the joint range as described in detail above with relation to joint limit avoidance constraints. Joint limits for self penetration avoidance need not correspond to the anatomical joint limits. Rather, they may be more conservative virtual joint limits whose values are obtained by manually verifying the bounds at which collision does not occur. Therefore, for two segments connected by a rotational joint, joint limit avoidance and self penetration avoidance may be performed by using the same techniques presented above.

Figure 7:
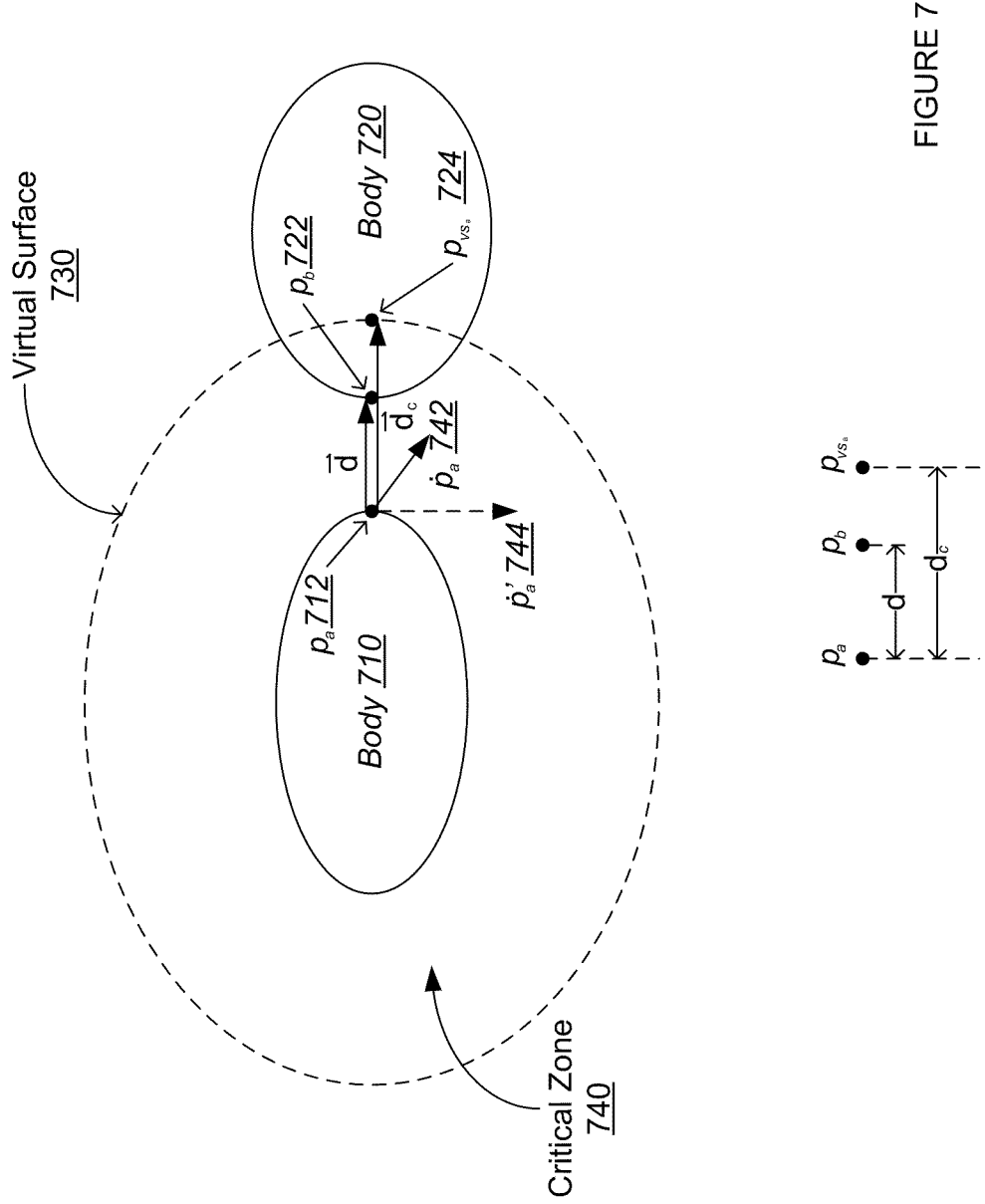
FIG. 7 is a diagram illustrating two unconnected rigid bodies redirected to avoid colliding into each other in accordance with one embodiment of the invention.

Considering the case of self penetration between two unconnected bodies, i.e. bodies which do not share a joint. FIG. 7 is a diagram illustrating two unconnected rigid bodies 710, 720 (i.e., bodies which do not share a joint) redirected to avoid colliding into each other according to one embodiment. In general, body 710 (also referred to as body A) and body 720 (also referred to as body B) may both be in motion. However, for simplicity and without losing generality, suppose body A is moving toward a stationary body B, as indicated by linear velocity $\dot{p}_a$ 742. The coordinates of the shortest distance d (d≥0) between the two bodies are denoted by $p_a$ 712 and $p_b$ 722, referring to the base frame of the joint space. The two points, $p_a$ and $p_b$, are also referred to as collision points.

The unit normal vector between the collision points is denoted by $$\hat{n}_a = \frac{p_b - p_a}{|p_b - p_a|},$$

and the vector pointing from $p_a$ to $p_b$ is denoted by $\vec{d}=d\hat{n}_a$. A 3-dimensional virtual surface 730 is constructed to surround body A, shown by a dashed line in FIG. 7. For every point on body A, its associated virtual surface point is located by a vector $\vec{d}_c = d_c \hat{n}$, where $d_c$ is a critical distance, and $\hat{n}$ is the unit normal vector at the surface point. The coordinates of the point on the virtual surface corresponding to $p_a$, denoted by $p_{vs_a}$ 724, is defined by $$p_{vs_a} = p_a + d_c \hat{n}_a. \tag{14}$$

The region between the actual surface of body A and its virtual surface 730 is referred to as the critical zone 740. If body B is stationary, the motion at $p_a$ can be redirected to prevent penetration in the critical zone 740. This redirection is invoked when $d < d_c$.

According to one embodiment, the pose estimation system 100 controls (or redirects) the motion of $p_a$ by modifying the trajectory of the desired task feature $p_d$. A redirected motion of $p_a$ is denoted by $p'_a$ and its associated velocity by $\dot{p}'_a$ 744.

The collision point can be redirected to prevent the two bodies from penetrating deeper into the critical zone 740 using different magnitude and direction of $\dot{p}'_a$ 744. In one embodiment, the collision point $p_a$ is redirected in a direction opposite to the unit normal vector $\hat{n}_a$. In another embodiment, the collision point $p_a$ is redirected so that it slides along a direction which is tangent to the surface of body A at the collision point $p_a$, as shown in FIG. 7.

$$\dot{p}'_a = \dot{p}_a - \langle \dot{p}_a, \hat{n}_a \rangle \hat{n}_a. \tag{15}$$

Utilizing the above redirection vector, the collision point motion of $p_a$ is guided along the virtual surface boundary, producing a more natural motion toward its target.

To find the mapping between $\dot{p}'_a$ and $\dot{p}_d$ consider first the equivalent redirected joint velocity vector $\dot{q}'$, given by $$\dot{q}' = J^*_a \dot{p}'_a + SJ^*_a (\dot{p}_d + Ke), \tag{16}$$

where $J_a = \partial p_a / \partial q$ is the Jacobian at the collision point $p_a$ and $J^*_a$ is its weighted Damped Least Squares inverse. The matrix $S = \text{diag}(s_1 \ldots s_n)$ is a diagonal selection matrix where $s_i = 1$ when the $i_{th}$ column of $J_a$ has all zero entries and $s_i = 0$ elsewhere. The term $J^*_a(\dot{p}_d + Ke)$ is the joint velocity solution obtained from Equation 5.

The physical interpretation of Equation 16 is as follows. The first term determines the joint velocities needed to redirect the collision point velocities along $\dot{p}'_a$. Any zero column of $J_a$ (all zero entries) implies that the associated degree of freedom does not contribute to the motion of the collision point $p_a$. The second term in Equation 16 is the orthogonal complement of the first term which computes the entries for those joint velocities which do not affect the motion of the collision point $p_a$.

Based on the collision free joint velocity commands computed from Equation 16, a redesigned position task descriptor trajectory may be computed as follows $$\dot{p}'_d = J\dot{q}'. \tag{17}$$

The closed loop inverse kinematics equation with the modified parameters is given by $$\dot{q} = J^*(\dot{p}'_d + K'e'), \tag{18}$$

where $e' = p'_d - p'$ and $K'$ is an adaptively changing diagonal feedback gain matrix whose values decrease as the distance d decreases. Note that $p'_d$ at the current time t may be computed by a first order numerical integration, $$p'_d(t) = p'_d(t-dt) + \dot{p}'_d(t-dt)dt. \tag{19}$$

The instantaneous redirection $\dot{p}_a \rightarrow \dot{p}'_a$, as described above, produces a discontinuous first derivative of $p_a$ at the boundary $d = d_c$. The discontinuity at $\dot{p}_a$ results in a discontinuity in $\dot{p}_d$, as given by the solution in Equation 17. To preserve first order continuity, the solutions of $\dot{p}'_d$ may be blended before and after redirection occurs. A blended solution to Equation 17 is given by $$\dot{p}'_d = (1-b)\dot{p}_d + bJ_p\dot{q}', \tag{20}$$

where b is a suitable blending function such as the following Sigmoidal function $$b(d) = \frac{e^{-\alpha(d/d_c - \delta)}}{1 + e^{-\alpha(d/d_c - \delta)}}, \tag{21}$$

where $\alpha$ and $\delta$ are scalar parameters used to modulate the blending rate and shift of the blending function, respectively. Further information of the blending function is found in U.S. application Ser. No. 12/257,664, filed Oct. 24, 2008, titled "Real-Time Self Collision And Obstacle Avoidance", the content of which is incorporated by reference herein in its entirety.

The case where body A is stationary and body B is in motion is the dual of the problem considered above. When both body A and body B are in motion, the redirection vectors can be specified at the critical points $p_a$ and $p_b$ and the task augmentation can be utilized to control both critical points. The augmented velocity vector and Jacobian at the critical points are described by, $$\dot{p}_{ab} = [\dot{p}'_a \dot{p}'_b]^T, \tag{22}$$

$$J_{ab} = [J_a J_b]^T. \tag{23}$$

The redirected joint velocities can be solved following the same procedure as in Equation 16, $$\dot{q}' = J^*_{ab}\dot{p}'_{ab} + SJ^*_{ab}(\dot{p}_d + Ke). \tag{24}$$

The redirected task descriptors and the inverse kinematics solution follows the same procedure as previously described when only the motion of body A is considered. Further information of a process for preventing collisions between unconnected bodies utilizing the above algorithm is found in U.S. application Ser. No. 12/257,664, filed Oct. 24, 2008, titled "Real-Time Self Collision And Obstacle Avoidance", the content of which is incorporated by reference herein in its entirety.

Example

Figure 8A:
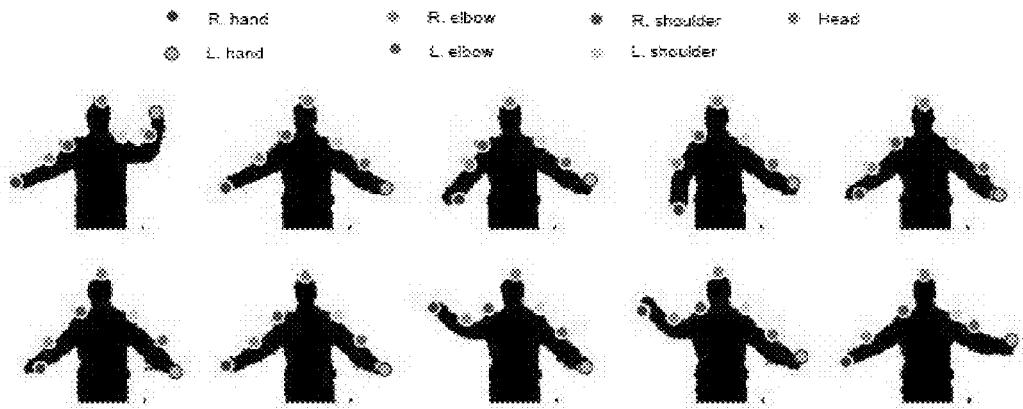
FIGS. 8A-B are diagrams showing snapshots of human body with labeled feature points in accordance with one embodiment of the invention.
Figure 8B:
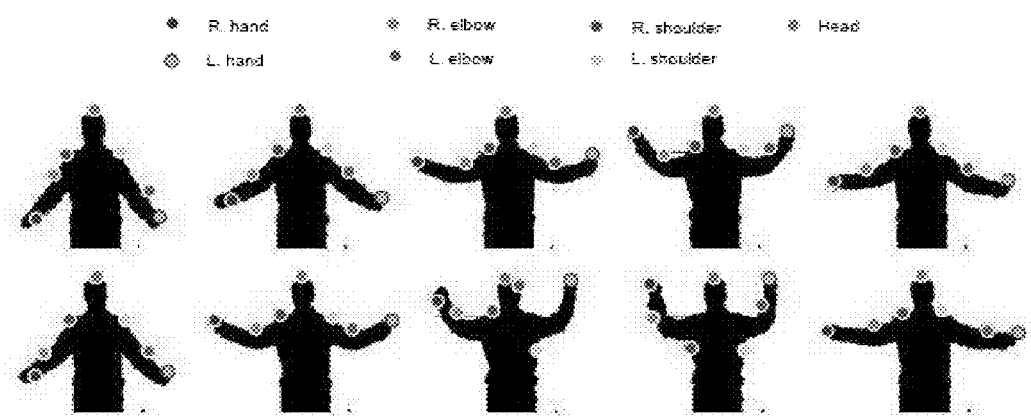

One embodiment of the disclosed human pose estimation system is tested using a single TOF camera. Two human body motion sequences are captured by the TOF camera and fed into the human pose estimation system. Snapshots of the first sequence are shown in FIG. 8A, and snapshots of the second sequence are shown in FIG. 8B. As shown in FIG. 8A, the following seven key feature points are manually labeled in the snapshots of the first sequence: head top, left shoulder, right shoulder, left elbow, right elbow, left hand, and right hand. IDSC Descriptors of these key feature points are calculated to construct the IDSC gallery. The human pose estimation system then detects the key feature points in the second sequence by sampling contour points and comparing their IDSC descriptors with the IDSC gallery. The human pose estimation system achieved 85% detection rate with an eight-pixel neighborhood support comparing with the ground truth. The key point detection is accepted as correct if the location of the detected key point lies within a 4×4 region centered around its actual location specified by the ground truth. Sample detection results are shown in FIG. 8B.

The above test result is very encouraging, given that the gallery had considerably different poses from that of the test images. For further detail of the test, please refer to U.S. Provisional Application No. 61/155,439, filed Feb. 25, 2009, the content of which is incorporated by reference herein in its entirety.

Additional Embodiments

The above embodiments describe a pose estimation system for detecting features and estimating body poses of a human actor in real time. One skilled in the art would understand that the pose estimation system can be used for feature detection and pose estimation of other motion generators such as animals. In addition, the pose estimation system can be configured to provide additional functions such as motion retargeting, robotic motion generation and control, and joint torque estimation in biomechanics. For example, the output of the pose estimation system can be effectively used to transfer human motion to a humanoid robot in real time.

In one embodiment, instead of or in addition to detecting feature points based on 2D IDSC descriptors of contour points on a 2D human silhouette, the pose estimation system calculates 3D inner distance shape contexts (also called spherical shape context, 3DIDSC) of surface points on a 3D human figure (e.g., in a depth image). The pose estimation system can detect feature points on the surface of the human 3D figure by sampling surface points along the surface of the figure, calculating 3DIDSC descriptors for the sampled surface points, and comparing the 3DIDSC descriptors to a 3DIDSC gallery of known feature points.

Embodiments of the disclosed invention provides a computationally fast, model based control theoretic approach to detect body features and estimate human pose from the detected body features. The disclosed pose estimation system can successfully reconstruct poses of difficult motion sequences which many previous approaches would have difficulty. In addition, the pose estimation system can reliably recover human poses from a small set of features.

Some portions of above description describe the embodiments in terms of algorithmic processes or operations, for example, the processes and operations as described with FIGS. 3 and 4.

One embodiment of the present invention is described above with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer based method for detecting a feature point of an object in an image of the object, the method comprising:
receiving a plurality of sequential images including the image and a previous image captured earlier in time than the image;
detecting a set of feature points from within the previous image;
estimating a pose of a human actor in a human model based on enforcing joint limitations and self-penetration avoidance based on the detected set of feature points from within the previous image;
segmenting an image region of the object from an image region of background in the image based on the estimated pose;
sampling a plurality of points along a contour of the segmented image region of the object;
determining Inner Distance Shape Context (IDSC) descriptors for the sampled plurality of points;
for each of the sampled plurality of points, comparing a threshold value with a difference between the IDSC descriptor of a point and a feature point IDSC descriptor of the feature point;
responsive to the threshold value exceeding differences associated with two or more of the sampled plurality of points, selecting one of the two or more of the sampled plurality of points as the feature point of the object in the image, wherein the object comprises a human actor;
augmenting a position of a missing feature point with the detected set of feature points based on the selected feature point; and
reconstructing a pose of the human actor based at least in part on the augmented missing feature point.

2. The method of claim 1, wherein the feature point IDSC descriptor is retrieved from an IDSC gallery comprising IDSC descriptors for each feature point of the object.

3. The method of claim 1, wherein the sampled plurality of points is sampled uniformly along the contour of the segmented image region of the object.

4. The method of claim 1, wherein the image comprises a depth image.

5. The method of claim 4, wherein segmenting the image region of the object comprises:
identifying image regions in the depth image with depth values exceeding a predetermined depth working volume as background; and
identifying image regions with vertical depth image normal vectors as background.

6. The method of claim 4, wherein the feature point comprises one of: head top, left shoulder, right shoulder, left elbow, right elbow, left wrist, right wrist, left waist, right waist, groin, left knee, right knee, left ankle, and right ankle.

7. The method of claim 4, wherein estimating the pose of the human actor in the human model further comprises:
tracking the estimated pose of the human model with an observed pose of the human actor.

8. The method of claim 4, further comprising:
generating a predicted feature point based on the augmented feature point and the joint limitations and self-penetration avoidance of the human model.

9. The method of claim 4, further comprises:
constructing a virtual surface surrounding an actual surface of a body segment of the human model;
monitoring a distance between the body segment and an unconnected structure;
detecting that the unconnected structure penetrates the virtual surface;
determining a redirected joint motion that prevents the unconnected structure from colliding with the body segment; and
redirecting the body segment based on the redirected joint motion to avoid colliding with the unconnected structure.

10. The method of claim 4, further comprising:
performing a skeleton analysis on the image region of the human actor to generate a skeleton image of the human actor;
performing distance transformation on the skeleton image to generate a distance transformed skeleton image of the human actor; and
detecting the feature point of the human actor in the distance transformed skeleton image.

11. The method of claim 10, wherein detecting the feature point of the human actor in the distance transformed skeleton image further comprises:
determining whether self occlusion is present in the depth image based on the distance transformed skeleton image; and
responsive to self occlusion being determined present in the depth image, conducting additional analysis of the depth image to detect the feature point of the human actor.

12. The method of claim 4, wherein the depth image is taken by a single time-of-flight camera.

13. The method of claim 1, further comprising:
labeling the detected feature point in the image.

14. The method of claim 1, wherein the set of feature points from within the previous image are detected based on a closed loop inverse kinematics computation of the reconstructed pose of the object in a prior image captured earlier in time than the previous image.

15. A non-transitory computer program product for detecting a feature point of an object in an image of the object, the computer program product comprising a computer-readable storage medium containing executable computer program code for performing a method comprising:
receiving a plurality of sequential images including the image and a previous image captured earlier in time than the image;
detecting a set of feature points from within the previous image;
estimating a pose of a human actor in a human model based on enforcing joint limitations and self-penetration avoidance based on the detected set of feature points from within the previous image;
segmenting an image region of the object from an image region of background in the image based on the estimated pose;
sampling a plurality of points along a contour of the segmented image region of the object;
determining Inner Distance Shape Context (IDSC) descriptors for the sampled plurality of points;

for each of the sampled plurality of points, comparing a threshold value with a difference between the IDSC descriptor of a point and a feature point IDSC descriptor of the feature point;

responsive to the threshold value exceeding differences associated with two or more of the sampled plurality of points, selecting one of the two or more of the sampled plurality of points as the feature point of the object in the image, wherein the object comprises a human actor;

augmenting a position of a missing feature point with the detected set of feature points based on the selected feature point; and reconstructing a pose of the human actor based at least in part on the augmented missing feature point.

16. A system for detecting a feature point of an object in an image of the object, the system comprising:

a computer processor for executing executable computer program code;

a computer-readable storage medium containing the executable computer program code for performing a method comprising:

receiving a plurality of sequential images including the image and a previous image captured earlier in time than the image;

detecting a set of feature points from within the previous image;

estimating a pose of a human actor in a human model based on enforcing joint limitations and self-penetration avoidance based on the detected set of feature points from within the previous image;

segmenting an image region of the object from an image region of background in the image based on the estimated pose;

sampling a plurality of points along a contour of the segmented image region of the object;

determining Inner Distance Shape Context (IDSC) descriptors for the sampled plurality of points;

for each of the sampled plurality of points, comparing a threshold value with a difference between the IDSC descriptor of a point and a feature point IDSC descriptor of the feature point;

responsive to the threshold value exceeding differences associated with two or more of the sampled plurality of points, selecting one of the two or more of the sampled plurality of points as the feature point of the object in the image, wherein the object comprises a human actor;

augmenting a position of a missing feature point with the detected set of feature points based on the selected feature point; and reconstructing a pose of the human actor based at least in part on the augmented missing feature point.

* * * * *